(12) United States Patent
Wange et al.

(10) Patent No.: US 11,816,598 B1
(45) Date of Patent: Nov. 14, 2023

(54) TRANSPORTATION SCHEDULING FOR CONTROLLED-ENVIRONMENT FACILITY RESIDENTS

(71) Applicant: Securus Technologies, LLC, Carrollton, TX (US)

(72) Inventors: John Wange, Dallas, TX (US); Dionisia Ray, Dallas, TX (US); Connor Pickens, Little Elm, TX (US); Sean North, Allen, TX (US)

(73) Assignee: Securus Technologies, LLC, Carrollton, TX (US)

( * ) Notice: Subject to any disclaimer, the term of this patent is extended or adjusted under 35 U.S.C. 154(b) by 209 days.

(21) Appl. No.: 17/132,991

(22) Filed: Dec. 23, 2020

(51) Int. Cl.
*G06Q 10/1093* (2023.01)
*G06F 9/54* (2006.01)
(Continued)

(52) U.S. Cl.
CPC ......... *G06Q 10/1093* (2013.01); *G06F 9/542* (2013.01); *G06Q 20/22* (2013.01); *G06Q 50/30* (2013.01)

(58) Field of Classification Search
CPC .. G06Q 50/26; G06Q 50/265; G06Q 20/3227; G06Q 50/184; G06Q 10/087; G06Q 10/0833; G06Q 10/00; G06Q 10/06; G06Q 10/083; H04M 3/2281; G11C 8/18; G06F 16/951
See application file for complete search history.

(56) References Cited

U.S. PATENT DOCUMENTS

2015/0077221 A1    3/2015    Peters et al.
2016/0088481 A1    3/2016    Byrne
(Continued)

FOREIGN PATENT DOCUMENTS

CA     2984513 C   *   9/2020  ............ G06F 16/00

OTHER PUBLICATIONS

"Prison Board Discusses Uber Ride Sharing for Released Inmates" [online]. WNEP, 2018 [retrieved on Aug. 29, 2022]. Retrieved from the Internet: <https://www.wnep.com/article/news/local/monroe-county/prison-board-discusses-uber-ride-sharing-for-released-inmates/523-85f48329-5fd5-4d67-a9a4-7894fddab3d6> (Year: 2018).*

*Primary Examiner* — Jerry O'Connor
*Assistant Examiner* — Michael R Koester
(74) *Attorney, Agent, or Firm* — Fogarty LLP (57) ABSTRACT

Scheduling and provisioning transportation by a controlled-environment facility resident may employ a controlled-environment facility resident communication and/or media device, which requests and accepts identification information, from a controlled-environment facility resident operating the device, and verifies the identification information. The device then presents a controlled-environment facility transportation interface, via which the device accepts input or selection of a date and time from the resident for pick-up of a party and a destination of the party. The device may then interface with a transportation provider computer system, or the like, and schedule the pick-up of the party at the input or selected date and time for transportation to the destination. The transportation is paid for from one or more controlled-environment facility trust accounts maintained by the controlled-environment facility to the benefit of the controlled-environment facility resident.

21 Claims, 4 Drawing Sheets

(51) Int. Cl.
*G06Q 50/30* (2012.01)
*G06Q 20/22* (2012.01)

(56) References Cited

U.S. PATENT DOCUMENTS

| | | | |
|---|---|---|---|
| 2016/0301896 A1* | 10/2016 | Keiser | H04L 65/1089 |
| 2017/0061560 A1* | 3/2017 | Bullard | G06Q 20/14 |
| 2021/0021705 A1* | 1/2021 | Rana, III | H04M 3/42357 |

* cited by examiner

TRANSPORTATION SCHEDULING FOR CONTROLLED-ENVIRONMENT FACILITY RESIDENTS

TECHNICAL FIELD

The present disclosure relates generally to controlled-environment facilities, more particularly to release of residents of controlled-environment facilities, and specifically to scheduling and provisioning (post-release) transportation of controlled-environment facility residents, such as correctional facility incarcerated individuals.

BACKGROUND

According to the World Prison Brief, hosted by the Institute for Crime & Justice Policy Research, in 2016, for example, 1 out of every 153 U.S. residents was incarcerated. Generally, incarcerated individuals convicted of felony offenses serve long sentences in prison (e.g., federal or state prisons), whereas those convicted of misdemeanors receive shorter sentences to be served in jail (e.g., county jail).

Additionally, over the past several years, the above-mentioned sharp increase in the U.S. incarcerated individual population has not been followed by a proportional increase in the number of prison or jail staff. To the contrary, budget pressures in local, state, and federal governments have made it difficult for correctional facilities to maintain an adequate number of wardens, officers, and other administration personnel. Hence, many correctional facilities are often unable to sufficiently monitor, or perform investigations with respect to, their incarcerated individuals, much less provide services to individuals who are released and no longer incarcerated individuals, such as providing transportation to incarcerated individuals/residents upon their release, and certainly not provide transportation to friends and family members wishing to visit an incarcerated individual. Therefore, currently there is not a good solution to transport released incarcerated individuals. Sometimes, a released incarcerated individual is given a bus ticket but there is not a good solution to get the released incarcerated individual off to a good start, such as to make sure they reach the intended destination in a timely manner.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to systems and methods wherein scheduling and provisioning transportation by a controlled-environment facility resident may employ a controlled-environment facility resident communication and/or media device. The device may request and accept identification information from a controlled-environment facility resident operating the device, and verify the identification information. The device then presents the resident a controlled-environment facility transportation interface, via which the device accepts input or selection of a date and time from the resident for pick-up of a party, and a destination of the party. The device may then interface with a transportation provider computer system, or the like, and schedule the pick-up of the party at the input or selected date and time for transportation to the destination. The transportation is paid for from one or more controlled-environment facility trust accounts maintained by the controlled-environment facility to the benefit of the controlled-environment facility resident. The controlled-environment facility resident communication and/or media device may be a personal controlled-environment facility resident communication and/or media device, or a communal controlled-environment facility resident communication and/or media terminal.

In various implementations of the present systems and methods a controlled-environment facility resident account management system, or the like, may maintain the controlled-environment facility resident trust account(s). In accordance therewith, the controlled-environment facility resident communication and/or media device may interface with the controlled-environment facility resident account management system to pay for the transportation from the trust account(s) maintained by the controlled-environment facility resident account management system.

Post-release transportation of the controlled-environment facility resident may be scheduled and provisioned in accordance with the present systems and methods, wherein the controlled-environment facility transportation interface is a controlled-environment facility resident post-release transportation interface for use by the resident. In some implementations the controlled-environment facility resident communication and/or media device may be a communal controlled-environment facility resident post-release transportation terminal, or the like. In such post-release implementations, where the transported party is the controlled-environment facility resident, the scheduled date and time may be a date and time for departure of the controlled-environment facility resident from the controlled-environment facility, following release of the controlled-environment facility resident from the controlled-environment facility. In such implementations, the destination may be a post-release destination of the controlled-environment facility resident and the pick-up of the party may be pick-up of the resident at the controlled-environment facility for transportation to this post-release destination.

Also, in post-release implementations, the input or selected date and/or time may be tentative. The controlled-environment facility resident account management system, or the like, may maintain controlled-environment facility housing assignment information, within the controlled-environment facility, of the controlled-environment facility resident and send a notification to a computer system of the a transportation provider to schedule the pick-up of the controlled-environment facility resident at the controlled-environment facility, in response to a status of the resident changing to released.

Further, in post-release implementations, the controlled-environment facility resident communication and/or media device may implement rules and regulations of the controlled-environment facility with respect to the controlled-environment facility resident. For example, these rules and regulations of the controlled-environment facility with respect to the resident may restrict addresses that may be the destination of the controlled-environment facility resident and the controlled-environment facility resident communication and/or media device may not accept input or selection of a destination not allowed by the rules and regulations of the controlled-environment facility with respect to the resident.

In other implementations the transported party may be a non-resident of a controlled-environment facility. In such implementations, the input or selected date and time are a date and time for departure of the non-resident from a location other than the controlled-environment facility housing the resident and the destination of the non-resident party is the controlled-environment facility housing the resident. Pick-up of the non-resident party may be pick-up of the non-resident for transportation to the controlled-environment facility housing the resident, in accordance therewith. Additionally, or alternatively in implementations where the party is a non-resident, the date and time may be a date and time for departure of a/the non-resident from the controlled-environment facility housing the resident. In such implementations, the destination of the non-resident party is away from the controlled-environment facility housing the resident and the pick-up of the non-resident party is pick-up of the non-resident for transportation away from the controlled-environment facility housing the resident.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Having thus described the invention in general terms, reference will now be made to the accompanying drawings, which are not necessarily drawn to scale, and wherein:

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as incarcerated individuals, arrestees, or detainees. It should be understood, however, that the systems and methods described herein may be similarly applicable to other types of controlled-environment facilities and their respective residents (e.g., a hospital and its patients, a school dormitory and its students, etc.).

Embodiments of the present systems and methods relate generally to such controlled-environment facilities, more particularly to release of residents of controlled-environment facilities, and specifically to scheduling and provisioning ((post-release)) transportation of controlled-environment (correctional) facility residents (incarcerated individuals).

Typically, if friends or family members are not available to pick-up a person upon their release from a controlled-environment facility such as a correctional institution, that person has difficulty securing transportation. For example, controlled-environment facility residents, such as correctional facility incarcerated individuals, rarely have credit cards, a valid email address, and/or the like required to book "rideshares," or other contract or public transportation. However, it is typically in the interest of such controlled-environment facilities that a released incarcerated individual or resident "move along," and it is typically the desire of the former incarcerated individual or resident to "get on with their life."

Embodiments of the present systems and methods provide incarcerated individual (controlled-environment facility resident) ride scheduling and provisioning that allows the incarcerated individual/resident to utilize funds in one or more controlled-environment facility trust account(s) maintained by the controlled-environment facility to the benefit of the resident/incarcerated individual to arrange and schedule transportation upon the date of their release. In accordance with embodiments of the present systems and methods, this scheduling may be made from a controlled-environment facility resident communication and/or media device, such as a resident's personal controlled-environment facility resident communication and/or media device (tablet computing device, smartphone, or the like adapted for use in the controlled-environment facility), a communal controlled-environment facility resident communication and/or media terminal, a (dedicated) communal controlled-environment facility resident (post-release) transportation terminal (e.g., a kiosk) disposed in the controlled-environment facility, such as in a lobby of the controlled-environment facility, for scheduling such (post-release) transportation, or the like. Variously, embodiments of the present systems and methods enable the resident/incarcerated individual to select a date and time for their departure as well as an address of the location of their destination. Since, as noted, controlled-environment facility residents, such as correctional facility incarcerated individuals, rarely have credit cards, a valid email address, and/or the or the like required to book rideshares, or other contract or public transportation, the transportation is paid for, in accordance with embodiments of the present systems and methods using a controlled-environment facility trust account maintained by, or in conjunction with, the resident's (incarcerated individual's) controlled-environment (correctional) facility to the benefit of the resident(incarcerated individual).

Thus, in accordance with embodiments of the present systems and methods, scheduling and provisioning transportation by a controlled-environment facility resident may employ a controlled-environment facility resident communication and/or media device, which requests and accepts identification information, from a controlled-environment facility resident operating the device, and verifies the identification information. The device then presents a controlled-environment facility transportation interface, via which the device accepts input or selection of a date and time from the resident for pick-up of a party and a destination of the party. The device may then interface with a transportation provider computer system, or the like, and schedule the pick-up of the party at the input or selected date and time for transportation to the destination. The transportation is paid for from one or more controlled-environment facility trust accounts maintained by the controlled-environment facility to the benefit of the controlled-environment facility resident.

Figure 1:
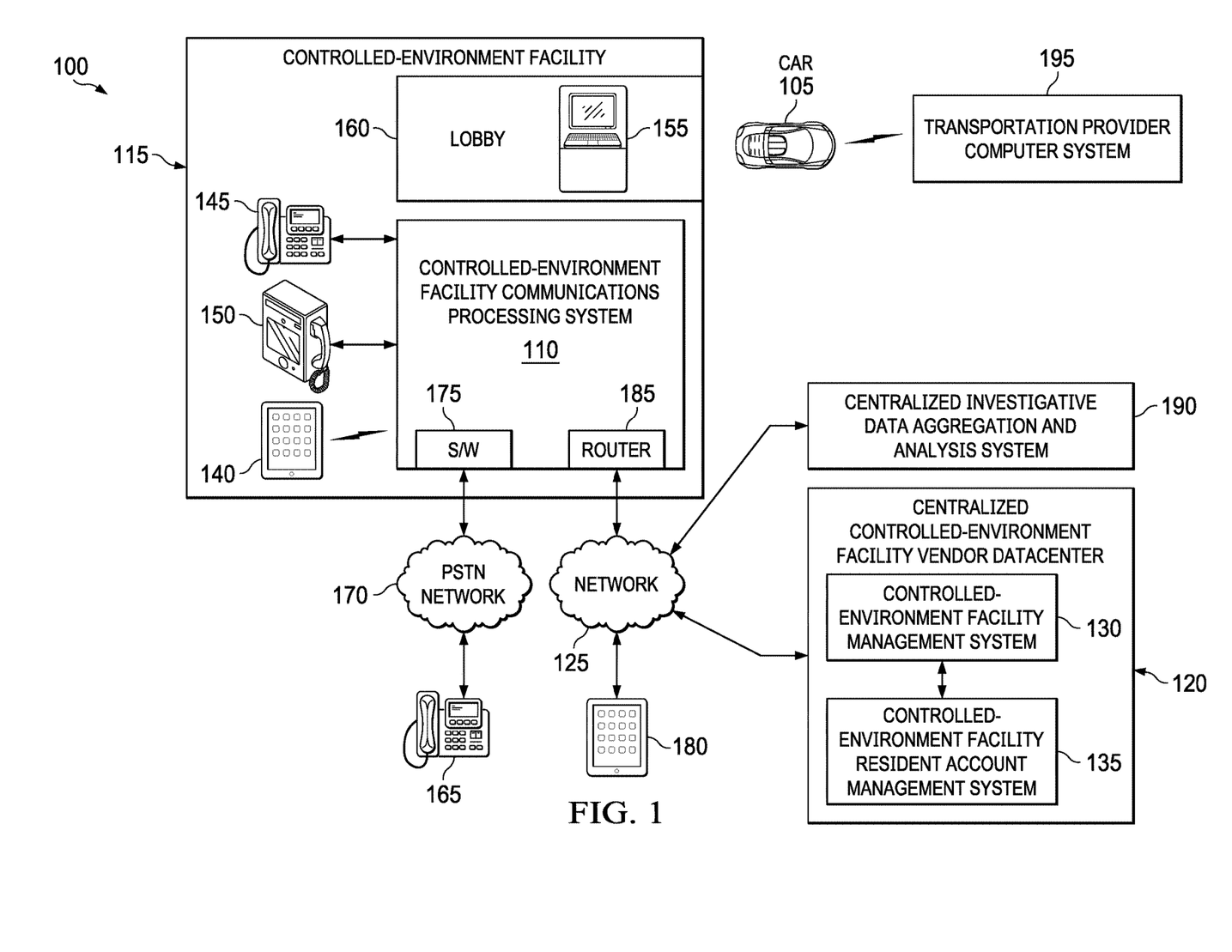
FIG. 1 is a block diagram of an example environment, wherein an example embodiment of the present systems and methods for scheduling and provisioning (post-release) transportation of controlled-environment (correctional) facility residents (incarcerated individuals) may be employed, in accordance with some embodiments.

FIG. 1 is a block diagram of example environment 100, wherein an example embodiment of the present systems and methods for scheduling and provisioning (post-release) transportation 105 for controlled-environment (correctional) facility residents (incarcerated individuals) may be employed, in accordance with some embodiments. In environment 100, controlled-environment facility communication processing system 110 may provide telephone services, videoconferencing, online chat, internet connectivity and other communication services to residents of controlled-environment facility 115. In some cases, such as illustrated, controlled-environment facility communication processing system 110 may be co-located with controlled-environment facility 115. Alternatively, or additionally, an external centralized communications processing system may be deployed in a controlled-environment facility vendor (e.g. a controlled-environment facility communications provider) datacenter 120, call center, or the like. That is, controlled-environment facility communication processing system 110 may be centrally and/or remotely located with respect to one or more controlled-environment facilities and/or may provide communication services to multiple controlled-environment facilities, in which case, controlled-environment facility 115 is illustrated as one example. Such a controlled-environment facility vendor datacenter may be connected to such facilities via a public network (e.g. the Internet) 125 or a private network (e.g. intranet), or the like (e.g., via a secure tunneling protocol over the internet, using encapsulation). More generally, however, it should be noted that controlled-environment facility communication system 110 may assume a variety of forms, including telephony switches such as electronic switching systems, or the like, and/or and may be configured to serve a variety of facilities and/or users, whether within or outside of a controlled-environment facility.

Controlled-environment facility management system 130 of controlled-environment facility vendor datacenter 120, which may include or be associated with (a separate) controlled-environment facility resident account management system 135, may maintain resident identification information, which may be stored in a separate database associated and/or controlled with controlled environment facility 115, such as a controlled-environment facility administration and management system database. In a correctional environment, such a controlled-environment facility management system (130) may be referred to as a jail management system (JMS). Controlled-environment facility resident account management system 135, may maintain resident (trust) accounts to the benefit of the respective resident, such as resident commissary accounts, resident communications accounts, which may be used to pay for purchase of a personal controlled-environment facility resident communication and/or media device (140), personal controlled-environment facility resident communication and/or media device accessories (headphones, wearables, etc.), communications (such as phone calls, video visitation, internet chats, emails, text messages), (post-release) transportation in accordance with embodiments of the present systems and methods, and/or the like.

Residents may use more-or-less conventional telephones 145 to access certain communication services. However, in accordance with embodiments of the present systems and methods, residents may also use a controlled-environment facility resident communication and/or media device 140, communal controlled-environment facility resident communication and/or media terminals 150 or the like, For example, personal computer wireless devices, such as a tablet computing device or smartphone (140), which may have been adapted and/or approved for use in controlled-environment facility, may be used by controlled-environment facility residents for communication. Such a personal resident device may be referred to as a "personal controlled-environment facility resident communication and/or media device," an Intelligent Resident Device (IRD) 140, or the like, in controlled-environment facilities, in general. These may also be referred to as an "incarcerated individual personal communications and/or media device," an Intelligent Incarcerated individual Device (IID) 140, or the like, in a correctional institution environment.

As noted, additionally, or alternatively, a resident may use a "communal controlled-environment facility resident communication and/or media terminal" 150, or the like, to place voice calls, as well as for video communication, execution of other apps, including media apps, games, job search apps, etc. Such a controlled-environment facility video communication terminal may be referred to as an Intelligent Facility Device (IFD) 140, which may be a video phone particularly adapted for use in a controlled-environment facility. Generally speaking, multiple controlled-environment facility resident communal communication and/or media terminals/IFDs 150 are disposed in a controlled-environment facility, and may be disposed in a visitation room, in a pod, as part of a kiosk, as an alternative to a controlled-environment facility communication kiosk, etc. As will be appreciated, IRD 140, IFD 150, or other similar devices have video conferencing capabilities, or the like, to enable a party to participate in video communication sessions with other call parties, such as non-residents of the controlled-environment facility, via video communication, secure online chat, etc. In some cases, IFD 150 may assume the form of any computer, tablet computer, smart phone, etc., or any other consumer device or appliance with videoconferencing capabilities. For example, in a correctional facility environment a tablet computing device (e.g., an IRD 140) may be mounted on a wall, in a hardened case, as a controlled-environment facility resident communal communication and/or media terminal or IFD (150). IFD 150 may also take the form of a docking station adapted to support and interface with an IRD 140 to provide communication, data, or other services.

Personal controlled-environment facility resident communication and/or media devices, IRDs 140, may be tablet computing devices, smartphones, media players, smart watches, or the like adapted and/or approved for use by residents of the controlled-environment facility (within the controlled-environment facility). Each IRD 140 may be particularly adapted for use in a controlled environment. For example, in a correctional institution, jail, or the like, such an IRD, or IID, may have a specifically adapted operating system and/or may be "stripped-down," particularly from the standpoint of what apps and/or hardware are provided or allowed on IRD 140, and/or connectivity afforded such an IRD. For example, such an IRD (140) may employ an operating system kernel built for use in such an IRD in a controlled-environment facility. As a further example, the IRD (140) may be adapted to only connect to a network provided by the controlled-environment facility, and/or in only certain locations, within the controlled-environment facility, such as may be controlled by availability of Wi-Fi access, or the like, only being available in certain areas. That is, for example, where streaming and/or downloading may be compartmentalized, leveraging the (concrete and steel) structure (i.e. construction, layout, etc.) of the controlled-environment facility, for example, limiting the availability of a Wi-Fi signal, providing the stream through the placement of wireless access points, antenna directionality of such wireless access points, and/or the like. Further, the IRD may allow access to apps or content only upon application of security measures, by the IRD. Such security measures may include determining, by the IRD, DNS spoofing, DNS redirection, use of proxy servers for privacy and security, biometric validation, password validation, and/or the like. Also, in accordance with embodiments of the present systems and methods, the IRD (140) may have a few fixed apps pre-installed on the device, and installation of further apps on the device may be forbidden (i.e. prevented by modifications to the device's operating system, or the like) and/or restricted, such as by requiring permission from a facility administrator, or the like. Apps provided on IRDs 140 might include apps of particular interest to residents of the controlled-environment facility. For example, IRDs 140 provided to incarcerated individuals of correctional facilities, might include apps that may be of particular use to an incarcerated individual, in general, such as access to a legal research service, or of more specific interest, such as providing an incarcerated individual nearing release, access to employment searching apps or the like. Hence, such incarcerated individual IRDs (140) may be used to help soon to be released incarcerated individuals transition. For example, the IRD (140) may be used to communicate with a future employer, or the like. As such, IRDs 140 may be sponsored, or otherwise subsidized by organizations or companies, assisting with the transition of incarcerated individuals into society, or the like.

While such personal controlled-environment facility resident communication and/or media devices, IRDs, IIDs, incarcerated individual personal communications and/or media devices (generally, 140), communal controlled-environment facility resident communication and/or media terminals 150 or the like, may be used to practice embodiments of the present systems and methods, a more-or-less dedicated terminal 155, (e.g., a communal controlled-environment facility resident (post-release) transportation terminal, kiosk, or the like) such as may be disposed in lobby 160, or otherwise, in controlled-environment facility 115 may be used in accordance with embodiments of the present systems and methods.

Such personal controlled-environment facility resident communication and/or media devices, IRDs, IIDs, incarcerated individual personal communications and/or media devices (generally, 140), communal controlled-environment facility resident communication and/or media terminals 150, dedicated terminal(s) 155, or the like, may be referred to generally (herein), individually or collectively as "controlled-environment facility resident communication and/or media device(s)."

In various embodiments, to access usual voice (or video) communication services, a resident may initiate approved telephone services by lifting the receiver on telephone 145 or IFD 150, and/or otherwise initiating a call, such as by launching a communications app on IRD 140 or IFD 150. At which time, the resident may be prompted to provide a personal identification number (PIN), other identifying information and/or biometrics. An Interactive Voice Response (IVR) unit (not shown, but which may be integrated into controlled-environment facility communication processing system 110) may generate and play a prompt, or other messages, to the resident on device 140, 145 or 150. Under the control of controlled-environment facility communication processing system 110, devices 140, 145 or 150 may be capable of connecting to a non-resident's (i.e., a person not incarcerated or otherwise committed to a controlled-environment facility) telephone 165 across a Publicly Switched Telephone Network (PSTN) 170. For example, telephone 165 may be located at a non-resident's home or office, at a resident visitation center, etc. Telephony switch 175, in controlled-environment facility communication processing system 110, may be used to connect calls across PSTN 170. Additionally or alternatively, the non-resident may communicate using device 180, which may be a mobile phone, tablet computing device, personal computer, or the like, which may be connected through an Integrated Services Digital Network (ISDN), Voice-over-IP (VoIP), or packet data network (such as, for example the Internet), a wireless communications network, or the like 125. Telephony router 185 of controlled-environment facility communication processing system 110 is used to route data packets associated with a call connection to device 180. For example, a non-resident party may have a device 180 with a built-in front-facing camera, or the like, and an integrated display (e.g., a smart phone, tablet, etc., as illustrated), a personal computer with a webcam, etc. A network connection between the parties may be established and supported by an organization or commercial service that provides computer services and software for use in telecommunications and/or VOIP, such as SKYPE®. Additionally, or alternatively, the correctional facility and/or the destination may use videoconferencing equipment compatible with ITU H.323, H.320, H.264, and/or V.80, or other suitable standards.

In addition to providing certain visitation and communication operations, controlled-environment facility communication processing system 110 may attempt to ensure that a resident's calls, video conferences, online chats, etc. are performed only with non-residents whose identities, devices, email addresses, phone numbers, etc. are listed in that resident's Pre-Approved Contact (PAC) and/or Pre-Approved Number (PAN) list. Each resident's PAC and/or PAN list(s) may be stored, for example, in (a) database(s) maintained by controlled-environment facility vendor datacenter 120 (such as by controlled-environment facility management system 130, controlled-environment facility resident account management system 135, or the like), centralized investigative data aggregation and analysis system 190 (discussed below), and/or the like. In addition to PAC and/or PAN list(s), controlled-environment facility vendor datacenter 120, centralized investigative data aggregation and analysis system 190, and/or the like, may also store Resident Profile Data (RPD), as well as communication and/or visitation rules applicable to each resident. This controlled-environment facility vendor datacenter 120 and/or centralized investigative data aggregation and analysis system 190 database(s) may include information such as balances for resident trust and calling accounts; trial schedule; conviction data; criminal record; sentencing data, such as time served, time remaining to be served, and release date; cell and cellmate assignments; resident restrictions and warnings; commissary order history; telephone call history; call recordings; known or suspected gang or criminal affiliations; known or suspected affiliates, accomplices, or gang members; and any other information that may be relevant or useful to correctional facility staff to house and maintain residents. In some implementations, controlled-environment facility communication processing system 110 may be configured to perform communication monitoring operations, such being configured to monitor and or record communication sessions (e.g., as electronic video files).

Computer-based environment components of embodiments of the present systems and methods may include programing and/or hardware to implement such embodiments. This programming may take the form of stored program instructions, programed firmware, or the like, while hardware might take the form of an Application Specific Integrated Circuit (ASIC), or the like, to carry out such aspects of embodiments of the present systems and methods. Thus, in accordance with embodiments of the present systems and methods, a controlled-environment communication and/or media device, IRD 140, IFD 150, dedicated kiosk 155, or the like may, as discussed in greater detail below, employ at least one processor and a memory coupled to the processor(s). This memory may, for example, be configured to store program instructions executable by the processor(s). These program instructions may include an operating system for controlled-environment resident communication and/or media device 140, 150 or 155 and a controlled-environment facility resident-user interface program or application that includes program instructions executable by the processor(s). This controlled-environment facility resident-user interface may run on top of, and/or as part of, the operating system of the device. This interface may act as a resident communications platform, and also or alternatively, provide automated login for interface apps, etc. In accordance with embodiments of the present systems and methods, the controlled-environment facility resident-user interface may request and accept identification information (e.g. a resident/incarcerated individual ID number, or the like and a PIN, or the like) from a controlled-environment facility resident operating controlled-environment resident communication and/or media device 140, 150 or 155. Controlled-environment resident communication and/or media device 140, 150 or 155, such as in some embodiments in conjunction with controlled-environment facility communication processing system 110, controlled-environment facility management system 130 and/or controlled-environment facility resident account management system 135 verify the identification information. The controlled-environment facility resident-user interface may then, such as, as part of presenting apps available for use by the resident/incarcerated individual-user of controlled-environment resident communication and/or media device (140 or 150), present a controlled-environment facility (post-release) transportation interface app for use by the controlled-environment facility resident.

Also, in accordance with various embodiments of the present systems and methods, controlled-environment resident communication and/or media device 140 or 150 may, automatically store app login information associated with the controlled-environment facility resident-user for each app, such as an app providing the present controlled-environment facility resident (post-release) transportation interface for use by the controlled-environment facility resident. In such embodiments, the resident-user may be automatically logged into a selected app, such as this controlled-environment facility resident (post-release) transportation app, using the stored app login information for the selected app upon selection of an icon, or the like, for the selected app. However, in some embodiments, controlled-environment facility resident communication and/or media device 140 or 150 may again request and accept identification information from the resident upon selection of the icon. In such embodiments, automatically logging the resident-user into the selected app may further entail verifying this (new) identification information (in conjunction with controlled-environment facility management system 130, controlled-environment facility resident account management system 135, or the like,) and then automatically logging the resident-user into the selected app using the stored app login information in response to verifying the identification information.

In some embodiments, controlled-environment facility resident (post-release) transportation app may only be made available on a controlled-environment facility resident communication and/or media device 140 or 150, for a particular resident (incarcerated individual) once a release date for that resident (incarcerated individual) is within a certain (predetermined) period of time. That is, the controlled-environment facility resident (post-release) transportation app may only appear on a controlled-environment facility resident communication and/or media device (140 or 150) being accessed by a resident (incarcerated individual) within a certain number of days or hours of the resident's (incarcerated individual) expected release date or time. Further, the controlled-environment facility resident (post-release) transportation app may implement an approval process, whereby the resident (incarcerated individual) may obtain approval to schedule a pick-up, in some embodiments of the present systems and methods.

The displayed controlled-environment facility (post-release) transportation interface may accept input or selection of a date and time from the controlled-environment facility resident for pick-up of a party and a destination of the party. Controlled-environment resident communication and/or media device 140, 150 or 155, may then interface with a transportation provider's computer system 195, or the like, such as a computer system of a "rideshare" company, or the like, and schedule the pick-up of the party at the input or selected date and time for transportation to the destination. In accordance with embodiments of the present systems and methods, since controlled-environment facility residents, such as correctional facility incarcerated individuals, rarely have credit cards, a valid email address, and/or the or the like required to book rideshares, or other contract or public transportation, transportation provisioned through embodiments of the present systems and methods are, as noted, paid for from one or more controlled-environment facility trust accounts maintained by the controlled-environment facility to the benefit of the controlled-environment facility resident, such as by controlled-environment facility resident account management system 135.

As noted, embodiments of the present systems and methods may be directed to scheduling and provisioning post-release transportation of the controlled-environment facility resident. Hence, the date and time entered or selected for departure in a controlled-environment facility resident post-release transportation interface may be, at least, a tentative date and (or) time the controlled-environment facility resident is expected to be released from the controlled-environment facility and the pick-up location will be the resident's controlled-environment facility (115) for transportation to the destination. In various embodiments, controlled-environment facility management system 130, controlled-environment facility resident account management system 135, or the like, may maintain controlled-environment facility housing assignment information of the controlled-environment facility resident, such as a cell number, or the like that the resident is assigned to within the controlled-environment facility. In such embodiments of the present systems and methods, controlled-environment facility management system 130, controlled-environment facility resident account management system 135, or the like, may, due to the tentative nature of the originally input or selected pick-up date, location, time, and/or the like, send a notification to, or otherwise communicate with, computer system 195 of a transportation provider, such as a rideshare company, or the like, to schedule the pick-up of the controlled-environment facility resident at controlled-environment facility 115, upon a (housing assignment) status of the controlled-environment facility changing (from the assigned cell number, or the like) to "released," or the like.

Further, rules and regulations of the controlled-environment facility (such as may be implemented by controlled-environment facility management system 130, or the like) with respect to the controlled-environment facility resident requesting transport are implemented in accordance with embodiments of the present systems and methods. For example, where the rules and regulations of the controlled-environment facility with respect to the controlled-environment facility resident restrict addresses that may be the destination of the controlled-environment facility resident, following release (e.g., a victim's, witness's, judge's, or prosecuting attorney's address, or the like, such as may be stored in controlled-environment facility resident account management system 135, or the like) embodiments of the present systems and methods may prevent controlled-environment resident communication and/or media device 140, 150 or 155 from accepting input or selection of a destination not allowed by the rules and regulations of the controlled-environment facility with respect to the controlled-environment facility resident. Additionally, or alternatively, approval of a destination address by controlled-environment facility (correctional) administrator may be required, in accordance with some embodiments of the present systems and methods. A decision of such an approval may be dependent on a seriousness of the crime for which the individual is incarcerated, or the like, in accordance with such embodiments In other implementations of embodiments of the present systems and methods the controlled-environment facility resident (incarcerated individual) may have the ability to provide rides for friends and family members, or the like. To facilitate transport of a non-resident visitor, such as a friend or family member to, and from the controlled-environment facility housing the resident, the date and time input or selected by the resident may be a date and time for departure of the non-resident from a location other than controlled-environment facility 115 housing the resident, such as from the non-resident's home. The destination of the non-resident would then be controlled-environment facility 115 housing the resident, from the pick-up location input by the resident.

In such embodiments of the present systems and methods, an approval request may be sent to the non-resident (friend or family member) that the non-resident may accept. Once acceptance is complete, a notification to the ride service (195) may be issued, such as by controlled-environment resident communication and/or media device 140, 150 or 155. Confirmation from the ride service that the ride is scheduled, then notification that drive is scheduled, may be issued to the controlled-environment resident communication and/or media device. Additionally, status updates, such as a notification that the ride is a minute or so away may also be issued to the controlled-environment resident communication and/or media device and/or a device (165 or 180) of the non-resident (identified at the time of scheduling of the ride by the controlled-environment facility resident).

To return a non-resident, a second date and time may be (separately) input or selected by the controlled-environment facility resident for departure of the non-resident from controlled-environment facility 115 housing the resident, for transport to a return destination of the non-resident, away from controlled-environment facility 115 housing the resident, such as the non-resident's home. Similar notifications, status updates, and/or the like may by be issued to schedule and facilitate the non-resident's ride from the controlled-environment facility to their return destination (home).

As with post-release transportation of the resident, (visitation) transportation of the non-resident, scheduled by the controlled-environment facility resident may be paid for though, or using, controlled-environment facility resident account management system 135, or the like, in accordance with embodiments of the present systems and methods. As noted, controlled-environment facility resident account management system 135, or the like, may be configured to maintain one or more controlled-environment facility trust accounts to the benefit of the controlled-environment facility resident, such as a resident commissary account, resident communications account, and/or the like. In accordance with embodiments of the present systems and methods controlled-environment facility resident communication and/or media device 140, 150 or 155 may interface with, or otherwise direct, controlled-environment facility resident account management system 135 to pay for the transportation from the controlled-environment facility trust account(s) maintained by the controlled-environment facility resident account management system to the benefit of the controlled-environment facility resident, such as upon completion of the transportation to the destination.

Alternatively, particularly in controlled-environment situations where an incarcerated individual is only detained for a short time, such as in a city or county jail, following arrest (and before conviction) The transportation requested and provided in accordance with the present systems and methods may be paid for using a credit card, debit card, or the like of the released incarcerated individual.

In accordance with some embodiments of the present systems and methods controlled-environment facility vendor datacenter 120 (controlled-environment facility management system 130, controlled-environment facility resident account management system 135, or the like), centralized investigative data aggregation and analysis system 190, and/or the like, may maintain information about transportation taken, or attempted, employing embodiments of the present systems and method.

Centralized investigative data aggregation and analysis system 190 may be a platform for providing investigative tools in communication, such as via public network 125, with controlled-environment facility 115, namely controlled-environment facility communication processing system 110, and/or the like. Such investigative tools may provide collection, processing, analysis, and/or reporting of information for intelligence purposes. In some embodiments, the investigative tools may provide functions such as entity linkage analysis, communication statistics, organization analysis, communication behavior analysis, subscription usage analysis, common communication analysis, timelines, correlations, mapping, word search, language translation (whether machine translation or access to translation services), call recording (whether terminated external to the controlled-environment facility or internally thereto), call notification, call monitoring (whether real-time or recorded, and whether monitoring a particular call or a plurality of calls), call "barging," call control, visitation monitoring/background checking, crime tip conduit, account activity monitoring (whether tracing deposits and expenditures of monies or monitoring account trends and behavior, such as velocity of transactions), multiple database querying, and resource integration, and/or the like. One or more of these investigative tools may be provided through an intuitive user interface to provide ease of use, facilitate operation across a variety of user terminals, and/or to facilitate remote access to one or more features thereof. For example, in some cases, a web-based portal enabling individuals to store and transmit information, including forensic tools that analyze communications into and out of controlled-environment facilities to assist law enforcement may be provided. Such a web page portal may have menus comprising an investigator dashboard, to present and facilitate execution of various investigative operations. These investigative tools may log calls (e.g., as Call Detail Records (CDRs)), so that an investigator may research them through an archive and may be provided access to internal and/or external criminal databases and/or other sources of useful information. Centralized investigative data aggregation and analysis system 190, and the like, as noted, may, in accordance with embodiments of the present systems and methods, provide collection, processing, analysis, and/or reporting of information about transportation taken, or attempted, employing embodiments of the present systems and method, for intelligence purposes. Such usage analysis may be based on destination(s), frequency of use of non-resident transportation, identity of the non-resident(s), time/length travel, pattern of use, relationship of the non-resident to the incarcerated individual, and/or the like.

Figure 2:
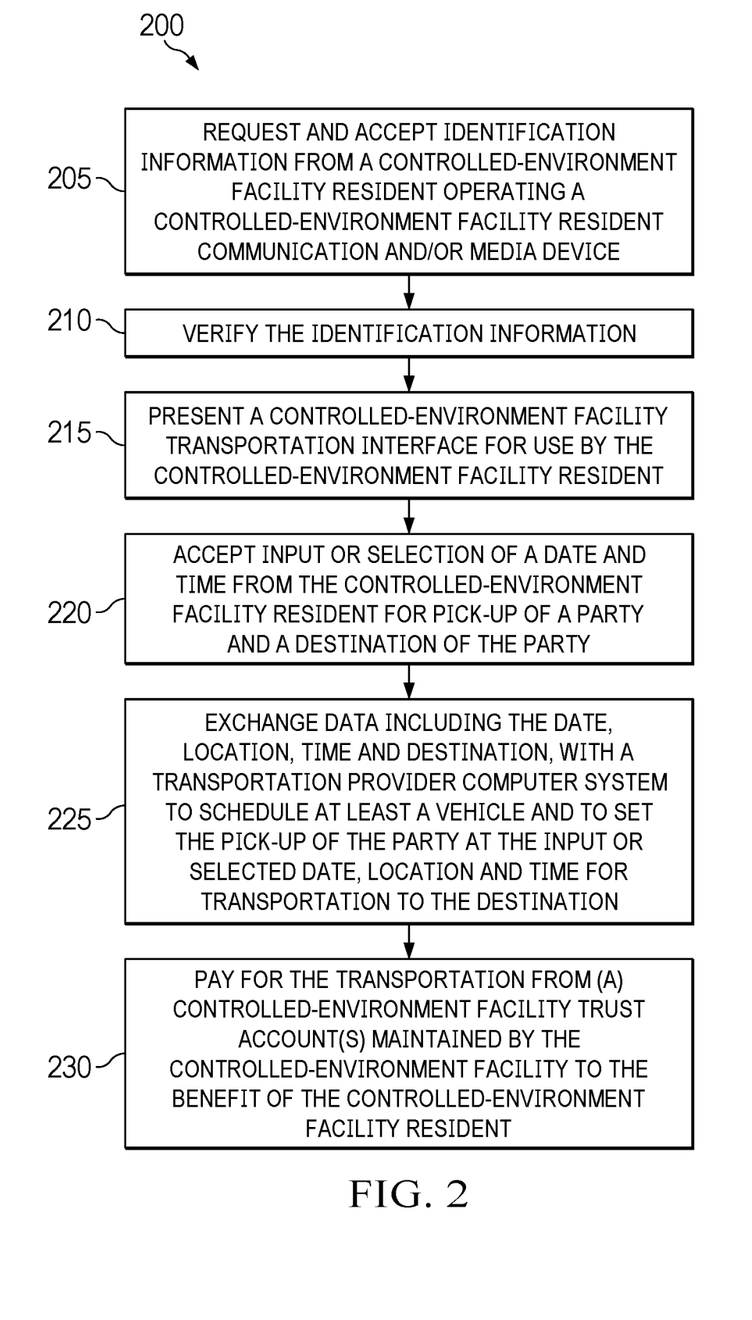
FIG. 2 is a flowchart of an example process for scheduling and provisioning (post-release) transportation of controlled-environment (correctional) facility residents (incarcerated individuals), according to some embodiments.

FIG. 2 is a flowchart of example process 200 for scheduling and provisioning (post-release) transportation (105) for controlled-environment (correctional) facility residents (incarcerated individuals), according to some embodiments. Therein, a controlled-environment facility (post-release) transportation interface runs on a controlled-environment facility resident communication and/or media device (140, 150 or 155), at 205 requests and accepts identification information from a controlled-environment facility resident operating the controlled-environment facility resident communication and/or media device. At 210 the controlled-environment facility resident communication and/or media device verifies the identification information, such as, in conjunction with a controlled-environment facility management system (130), controlled-environment facility resident account management system (135), or the like.

At 215 the controlled-environment facility resident communication and/or media device presents a controlled-environment facility (post-release) transportation interface for use by the controlled-environment facility resident. At 220, the controlled-environment facility resident communication and/or media device accepts, via the controlled-environment facility (post-release) transportation interface, input or selection of a date and time from the controlled-environment facility resident for pick-up of a party to be transported and a destination of the party.

The controlled-environment facility resident communication and/or media device then interfaces with a transportation provider computer system (195), such as a computer system of a rideshare company, or the like, and schedules the pick-up of the party at the input or selected date and time for transportation to the destination. For example, at 225, the controlled-environment facility resident communication and/or media device, provides (or otherwise exchanges) data, including at least the date, location, time and destination, with a transportation provider computer system to schedule, by the transportation provider computer system, at least a vehicle (and driver) and to set the pick-up of the party at the input or selected date and time, from the location, for transportation to the destination.

At 230, prior to the initiation of the transportation, or following, or upon, the party reaching the destination, the transportation is paid for from one or more controlled-environment facility trust accounts maintained by the controlled-environment facility to the benefit of the controlled-environment facility resident. Paying for the transportation at 230 may entail the controlled-environment facility resident communication and/or media device initiating payment for the transportation, by, or though, the controlled-environment facility resident account management system, from the one or more of the controlled-environment facility trust accounts maintained by the controlled-environment facility resident account management system to the benefit of the controlled-environment facility resident.

As noted, the forgoing may be implemented for scheduling and provisioning (post-release) transportation by the controlled-environment facility resident, such as by a correctional facility incarcerated individual in anticipation of release on a scheduled date. In such implementations, where the above-discussed party is the controlled-environment facility resident, him or herself, the date and time input or selected at 220 may be at least a tentative date and time are for departure of the controlled-environment facility resident from the controlled-environment facility following release of the controlled-environment facility resident from the controlled-environment facility and the destination set at 220 is a post-release destination of the controlled-environment facility resident, such as a half-way house, prearranged housing, or the like. Since, as noted, the input or selected date and/or time may be tentative in such implementations, a controlled-environment facility resident account management system, or the like maintain controlled-environment facility housing assignment information of the controlled-environment facility resident may send, and/or the controlled-environment facility resident communication and/or media device may send an notification or other signal to the transportation provider computer system (195) to schedule the pick-up of the controlled-environment facility resident at the controlled-environment facility, in response to a (housing assignment) status of the controlled-environment facility changing to "released," or the like.

Alternatively, particularly in controlled-environment situations where an incarcerated individual is only detained for a short time, such as in a city or county jail, following arrest (and before conviction) The transportation requested and provided in accordance 205 through 225 above, may be paid for using a credit card, debit card, or the like of the released incarcerated individual.

As noted, embodiments of the present systems and methods may implement rules and regulations of the controlled-environment facility with respect to the controlled-environment facility resident. For example, the rules and regulations of the controlled-environment facility with respect to the controlled-environment facility resident may include restricting addresses that may be the destination of the controlled-environment facility resident. In such examples, the controlled-environment facility resident communication and/or media device may refuse input or selection of a destination not allowed by the rules and regulations of the controlled-environment facility with respect to the controlled-environment facility resident (such as the aforementioned victim's, witness's, judge's, or prosecuting attorney's address, or the like).

Figure 3:
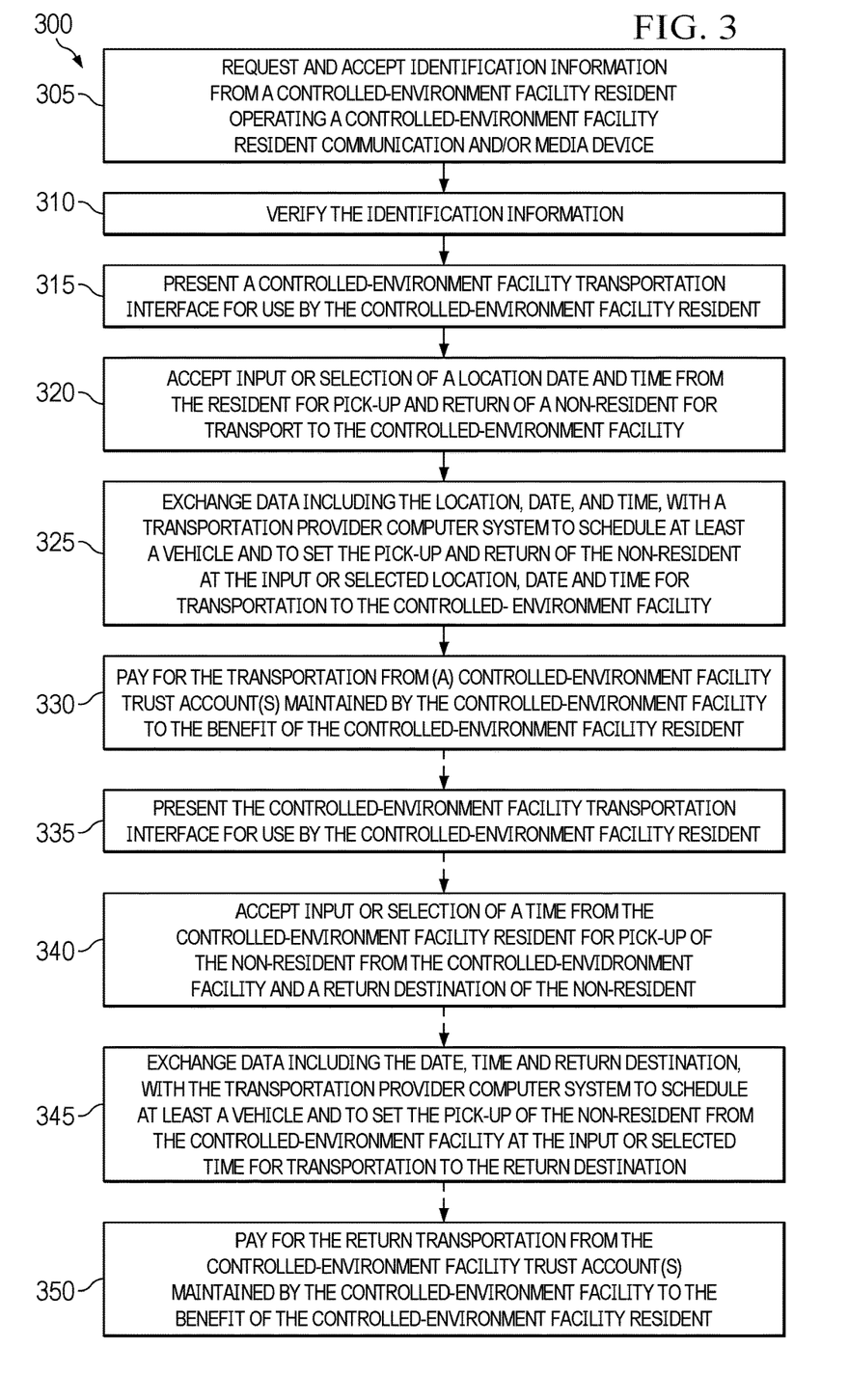
FIG. 3 is a flowchart of an example process for scheduling and provisioning transportation for a non-resident, to and from a controlled-environment facility, according to some embodiments.

As noted, in other implementations the controlled-environment facility resident may employ embodiments of the present systems and methods to facilitate transport of a non-resident visitor, such as a friend or family member, or the like, to, and from, the controlled-environment facility housing the resident. In such implementations where the above-discussed party is a non-resident the date and time input or selected at 220 may be a date and time for departure of the non-resident from a location other than the controlled-environment facility housing the resident, such as then-resident's home, and hence, the destination input at 220 is the controlled-environment facility housing the resident. Conversely, to return the non-resident (home) a second date and time may be input or selected by the resident (in a separate session of implementation 200) at 220 to set the departure of the non-resident from the controlled-environment facility housing the resident, for transport to a destination of the non-resident, also set (in the separate session of implementation 200) at 220, such to the non-resident's home, from the resident's controlled-environment facility. To wit, FIG. 3 is a flowchart of example process 300 for scheduling and provisioning transportation (105) for a non-resident to and from a controlled-environment facility, according to some embodiments.

A controlled-environment facility transportation interface runs on a controlled-environment facility resident communication and/or media device (140, 150 or 155) and at 305 requests and accepts identification information from a controlled-environment facility resident operating the controlled-environment facility resident communication and/or media device. At 310 the controlled-environment facility resident communication and/or media device verifies the identification information, such as, in conjunction with a controlled-environment facility management system (130), controlled-environment facility resident account management system (135), or the like.

At 315 the controlled-environment facility resident communication and/or media device presents a controlled-environment facility transportation interface for use by the controlled-environment facility resident. At 320, the controlled-environment facility resident communication and/or media device accepts, via the controlled-environment facility transportation interface, input or selection of a date and time from the controlled-environment facility resident for pick-up of a non-resident to be transported to the controlled-environment facility and input of a location the nonresident is to be picked up from.

The controlled-environment facility resident communication and/or media device may then interface with a transportation provider computer system (195), such as a computer system of a rideshare company, or the like, and schedules the pick-up of the non-resident from the indicated location for transportation to the controlled-environment facility. For example, at 325, the controlled-environment facility resident communication and/or media device, provides (or otherwise exchanges) data, including at least the date, location, time and destination, with a transportation provider computer system to schedule, by the transportation provider computer system, at least a vehicle (and driver) and to set the pick-up of the non-resident at the input date and time, from the location, for transportation to the controlled-environment facility.

At 330, such as before the pickup, or following, or upon, the non-resident reaching the controlled-environment facility, the transportation is paid for from one or more controlled-environment facility trust accounts maintained by the controlled-environment facility to the benefit of the controlled-environment facility resident, as described above.

To return the non-resident (home) a second date and time may be input or selected by the resident at 320, or alternatively, in a separate session at 335, to set the departure of the non-resident from the controlled-environment facility, for transport to a destination of the non-resident, from the resident's controlled-environment facility, at 340. This destination of the non-resident, such as to the non-resident's home, may also be set at 320, or set in the separate session at 340.

Likewise, when the controlled-environment facility resident communication and/or media device interfaces with the transportation provider computer system (195) at 325, the pick-up of the non-resident from the controlled-environment facility for return to the indicated return destination may also be scheduled, by the same, or a different vehicle, at the scheduled time. Alternatively, the controlled-environment facility resident communication and/or media device, or the like may separately interface with the transportation provider computer system (195) at 345, particularly where the pickup of the non-resident has been separately scheduled at 340, to schedule pick-up of the non-resident from the controlled-environment facility for return to the indicated return destination, by the same, or a different vehicle, at the scheduled time.

Also, the return transportation of the non-resident may be paid for from the controlled-environment facility trust account(s) maintained by the controlled-environment facility to the benefit of the controlled-environment facility resident at 330. However, particularly where the pickup of the non-resident has been separately scheduled at 340, the return transportation of the non-resident may be paid for from the controlled-environment facility trust account(s) at 350, such as before the return pickup, or following, or upon, the non-resident reaching the return destination.

Various elements of the present systems and methods for scheduling and provisioning (post-release or non-resident) transportation by controlled-environment facility residents, such as correctional facility incarcerated individuals, may be implemented as modules. Modules may be implemented in hardware. In another embodiment, modules may be expressed in software executed by hardware. In still another embodiment, modules may be implemented in firmware operated by hardware. In still other embodiments, modules may be implemented in combinations of hardware, software, and/or firmware.

Figure 4:
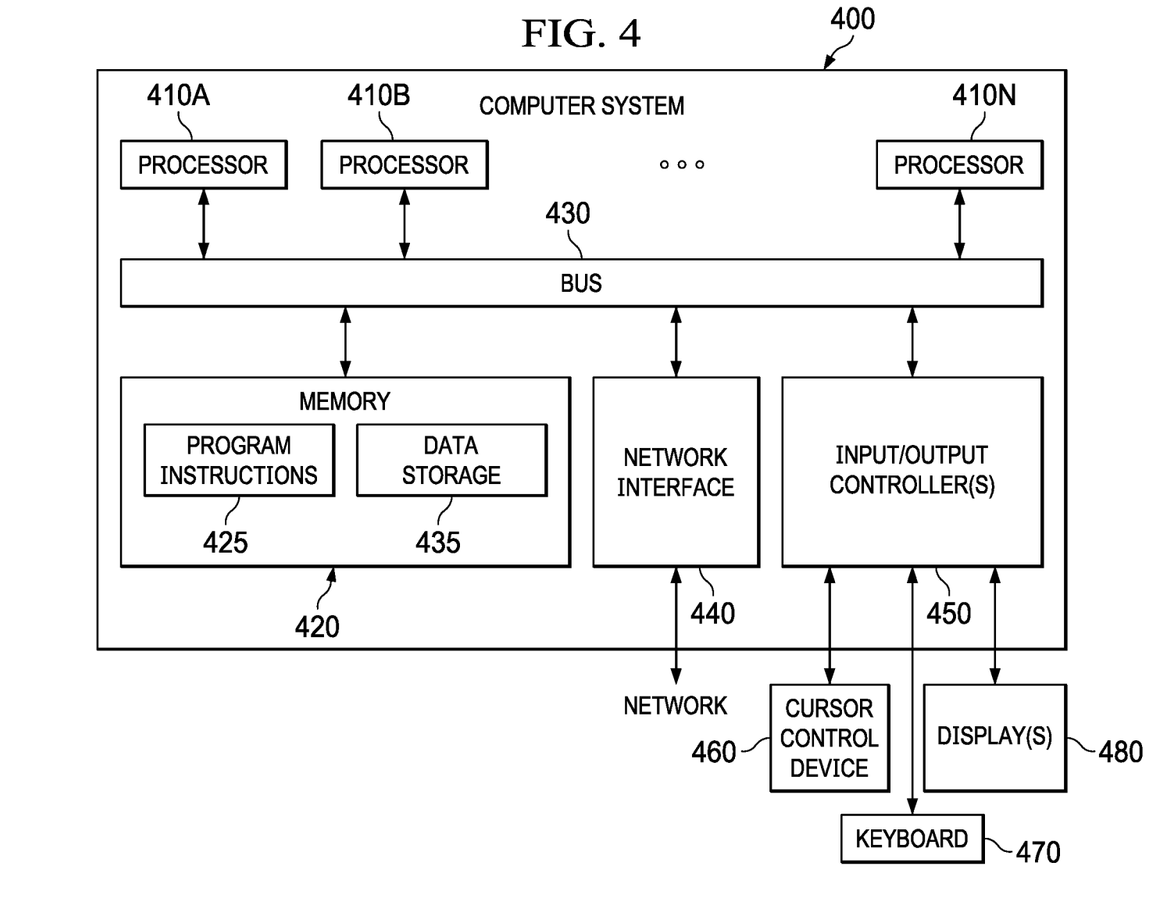
FIG. 4 is a block diagram of a computer system, device, station, or terminal configured to implement various techniques disclosed herein, according to some embodiments.

Embodiments of the present systems and methods for scheduling and provisioning (post-release) transportation by controlled-environment facility residents, such as correctional facility incarcerated individuals, as described herein, may be implemented at least in part as, or executed, at least in part, by one or more computer systems. One such computer system is illustrated in FIG. 4. In various embodiments, computer system 400 may be a server, a mainframe computer system, a workstation, a network computer, a desktop computer, a laptop, a tablet computing device, media player, or the like. For example, in some cases, computer 400 may implement one or more steps of example process 200 described above with respect to FIG. 2, and/or a computer system such as computer system 400 may be used as part of, one or more of: controlled environment facility communication processing system 110; controlled-environment facility vendor datacenter 120 elements, such as controlled-environment facility management system 130, resident account management system 135, and/or the like; controlled-environment facility resident communication and/or media devices 140, 145 or 150; dedicated communal controlled-environment facility resident (post-release) transportation terminal/dedicated kiosk 155; non-resident communications devices 165 or 180; centralized investigative data aggregation and analysis system 190; and/or the like. In various embodiments two or more of these computer systems may be configured to communicate with each other in any suitable way, such as, for example, via public network 125, which may be the Internet, or the like, as discussed above, via a local area network using wired or wireless functionality, etc.

As illustrated, computer system 400 includes one or more processors 410A-N coupled to a system memory 420 via bus 430. Computer system 400 further includes a network interface 440 coupled to bus 430, and one or more I/O controllers 450, which in turn are coupled to peripheral devices such as cursor control device 460, keyboard 470, display(s) 480, etc. Each of I/O devices 460, 470, 480 may be capable of communicating with I/O controllers 450, for example, via a wired connection (e.g., serial port, Universal Serial Bus port) or wireless connection (e.g., Wi-Fi, Bluetooth, Near Field Communications Link, etc.). Other devices may include, for example, microphones, antennas/wireless transducers, phone detection modules, etc.

In various embodiments, computer system 400 may be a single-processor system including one processor 410A, or a multi-processor system including two or more processors 410A-N (e.g., two, four, eight, or another suitable number). Processors 410 may be any processor capable of executing program instructions. For example, in various embodiments, processors 410 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 410 may commonly, but not necessarily, implement the same ISA. Also, in some embodiments, at least one processor 410 may be a graphics processing unit (GPU) or another dedicated graphics-rendering device.

System memory 420 may be configured to store program instructions and/or data accessible by processor 410. In various embodiments, system memory 420 may be implemented using any suitable memory technology, such as static random-access memory (SRAM), synchronous dynamic RAM (SDRAM), nonvolatile/Flash-type memory, or any other type of memory. As illustrated, program instructions and data implementing certain operations and modules such as those described herein may be stored within system memory 420 as program instructions 425 and data storage 435, respectively. In other embodiments, program instructions and/or data may be received, sent, or stored upon different types of computer-accessible media or on similar media separate from system memory 420 or computer system 400.

A computer-accessible medium may include any tangible and/or non-transitory storage media or memory media such as electronic, magnetic, or optical media—e.g., disk or CD/DVD-ROM coupled to computer system 400 via bus 430. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 430 may be configured to coordinate I/O traffic between processor 410, system memory 420, and any peripheral devices in the computer system, including network interface 440 or other peripheral interfaces, such as I/O devices 460, 470, 480. In some embodiments, bus 430 may perform any necessary protocol, timing, or other data transformations to convert data signals from one component (e.g., system memory 420) into a format suitable for use by another component (e.g., processor 410). In some embodiments, bus 430 may include support for devices attached through various types of peripheral buses, such as a variant of the Peripheral Component Interconnect (PCI) bus standard or the Universal Serial Bus (USB) standard, for example. In some embodiments, the function of bus 430 may be split into two or more separate components, such as a northbridge chipset and a southbridge chipset, for example. In addition, in some embodiments some or all the functionality of bus 430, such as an interface to system memory 420, may be incorporated directly into processor(s) 410A-N.

Network interface 440 may be configured to allow data to be exchanged between computer system 400 and other devices attached to a network, such as other computer systems, or between nodes of computer system 400. In various embodiments, network interface 440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

I/O controllers 450 may, in some embodiments, enable communications with one or more display terminals, keyboards, keypads, touchpads, scanning devices, voice or optical recognition devices, mobile devices, or any other devices suitable for entering or retrieving data by one or more computer system 400. Multiple I/O controllers 450 may be present in computer system 400 or may be distributed on various nodes of computer system 400. In some embodiments, I/O devices may be separate from computer system 400 and may interact with one or more nodes of computer system 400 through a wired or wireless connection, such as over network interface 440.

As shown in FIG. 4, system memory 420 may include program instructions 425, configured to implement certain embodiments described herein, and data storage 435, comprising various data may be accessible by program instructions 425. In an embodiment, program instructions 425 may include software elements, which may be configured to affect the operations discussed in FIGS. 1 and 2. Program instructions 425 may be implemented in various embodiments using any desired programming language, scripting language, or combination of programming languages and/or scripting languages (e.g., C, C++, C #, JAVA®, JAVASCRIPT®, PERL®, etc.). Data storage 435 may include data that may be used in these embodiments (e.g., recorded communications, profiles for different modes of operations, etc.). In other embodiments, other or different software elements and data may be included.

A person of ordinary skill in the art will appreciate that computer system 400 is merely illustrative and is not intended to limit the scope of the disclosure described herein. The computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

The various operations described herein, particularly in connection with FIGS. 1 through 4, may be implemented in software executed by processing circuitry, hardware, or a combination thereof. The order in which each operation of a given method is performed may be changed, and various operations may be added, reordered, combined, omitted, modified, etc. It is intended that embodiment(s) described herein embrace all such modifications and changes and, accordingly, the above description should be regarded in an illustrative rather than a restrictive sense.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for scheduling and provisioning transportation by a correctional facility incarcerated individual, the system comprising:

an incarcerated individual communication and/or media device adapted for use by a correctional facility currently incarcerated individual, within the correctional facility, under control of a correctional facility communication processing system configured to block access to transportation provider computer systems by currently incarcerated individuals, the correctional facility comprising a prison or jail incarcerating the incarcerated individual, the incarcerated individual communication and/or media device comprising:

at least one processor; and a memory coupled to the at least one processor, the memory configured to store program instructions executable by the at least one processor, the program instructions executable by the at least one processors to cause the incarcerated individual communication and/or media device to:

request and accept identification information from the incarcerated individual operating the incarcerated individual communication and/or media device;

verify the identification information;

present a correctional facility transportation interface for use by the incarcerated individual;

accept input or selection of a date and time from the incarcerated individual for pick-up of a party and a destination of the party;

interface, under the control of the correctional facility communication processing system bypassing the access block to transportation provider computer systems, with a transportation provider computer system and schedule the pick-up of the party at the input or selected date and time for transportation to the destination; and pay, under the control of the correctional facility communication processing system, for the transportation from one or more correctional facility trust accounts maintained by the correctional facility to the benefit of the incarcerated individual.

2. The system of claim 1, wherein:
the system enables scheduling and provisioning post-release transportation of the incarcerated individual;
the party is the incarcerated individual;
the date and time are a date and time for departure of the incarcerated individual from the correctional facility following release of the incarcerated individual from the correctional facility;
the destination of the party is a post-release destination of the incarcerated individual; and
the pick-up of the party is pick-up of the incarcerated individual at the correctional facility for transportation to the destination.

3. The system of claim 2, wherein the correctional facility transportation interface is a currently incarcerated individual post-release transportation interface for use by the incarcerated individual.

4. The system of claim 2, wherein the incarcerated individual communication and/or media device is a communal incarcerated individual post-release transportation terminal.

5. The system of claim 2, wherein the input or selected date and/or time are tentative, and the system further comprises an incarcerated individual account management system configured to:
maintain correctional facility housing assignment information of the incarcerated individual within the correctional facility;
send a notification to a computer system of the transportation provider to schedule the pick-up of the incarcerated individual at the correctional facility, in response to a status of the incarcerated individual changing to released.

6. The system of claim 2, wherein the program instructions further cause the incarcerated individual communication and/or media device to implement rules and regulations of the correctional facility with respect to the incarcerated individual.

7. The system of claim 6, wherein the rules and regulations of the correctional facility with respect to the incarcerated individual restricts destination addresses of the incarcerated individual and the program instructions are further executable to cause the incarcerated individual communication and/or media device to not accept input or selection of a destination not allowed by the rules and regulations of the correctional facility with respect to the incarcerated individual.

8. The system of claim 1, wherein:
the party is a non-incarcerated individual;
the date and time are a date and time for departure of the non-incarcerated individual from a location other than the correctional facility housing the incarcerated individual;
the destination of the party is the correctional facility housing the incarcerated individual; and
the pick-up of the party is pick-up of the non-incarcerated individual for transportation to the correctional facility housing the incarcerated individual.

9. The system of claim 1, wherein:
the party is a non-incarcerated individual;
the date and time are a date and time for departure of the non-incarcerated individual from the correctional facility housing the incarcerated individual;
the destination of the party is away from the correctional facility housing the incarcerated individual; and
the pick-up of the party is pick-up of the non-incarcerated individual for transportation away from the correctional facility housing the incarcerated individual.

10. The system of claim 1, further comprising an incarcerated individual account management system configured to maintain the one or more correctional facility trust accounts to the benefit of the incarcerated individual and the program instructions are further executable to cause the incarcerated individual communication and/or media device to interface with the incarcerated individual account management system to pay for the transportation from the one or more correctional facility trust accounts maintained by the incarcerated individual account management system to the benefit of the incarcerated individual.

11. The system of claim 1, wherein the incarcerated individual communication and/or media device is a personal incarcerated individual communication and/or media device.

12. The system of claim 1, wherein the incarcerated individual communication and/or media device is a communal incarcerated individual communication and/or media terminal.

13. A method for scheduling and provisioning transportation by an incarcerated individual, under control of a correctional facility communication processing system, the method comprising:
requesting and accepting, by an incarcerated individual communication and/or media device adapted for use by a currently incarcerated individual of a correctional facility within the correctional facility under control of the correctional facility communication processing system configured to block access to transportation provider computer systems by currently incarcerated individuals, the correctional facility comprising a prison or jail incarcerating the incarcerated individual, identification information from a currently incarcerated individual operating the incarcerated individual communication and/or media device;
verifying, by the incarcerated individual communication and/or media device, the identification information;
presenting a correctional facility transportation interface for use by the incarcerated individual on the incarcerated individual communication and/or media device;
accepting, by the incarcerated individual communication and/or media device, input or selection of a date and time from the incarcerated individual for pick-up of a party and a destination of the party;
exchanging data including at least the date, time and destination, by the incarcerated individual communication and/or media device, under control of the correctional facility communication processing system bypassing the access block to transportation provider computer systems, with a transportation provider computer system to schedule, by the transportation provider computer system, at least a vehicle and to set the pick-up of the party at the input or selected date and time for transportation to the destination; and paying, through the incarcerated individual communication and/or media device, under control of the correctional facility communication processing system, for the transportation from one or more correctional facility trust accounts maintained by the correctional facility to the benefit of the incarcerated individual.

14. The method of claim 13, wherein:
the party is the incarcerated individual;
the date and time are a date and time are for departure of the incarcerated individual from the correctional facility following release of the incarcerated individual from the correctional facility;
the destination of the party is a post-release destination of the incarcerated individual; and
the pick-up of the party is pick-up of the incarcerated individual at the correctional facility for transportation to the destination.

15. The method of claim 14, wherein input or selected date and/or time are tentative, and the method comprises:
maintaining, by an incarcerated individual account management system, correctional facility housing assignment information of the incarcerated individual within the correctional facility;
sending, by the incarcerated individual account management system and/or the incarcerated individual communication and/or media device, in response to a status of the incarcerated individual changing to released, a notification to the transportation provider computer system to schedule the pick-up of the incarcerated individual at the correctional facility.

16. The method of claim 14, wherein the correctional facility transportation interface is a currently incarcerated individual post-release transportation interface for use by the incarcerated individual.

17. The method of claim 13, further comprising implementing rules and regulations of the correctional facility with respect to the incarcerated individual.

18. The method of claim 17, wherein the rules and regulations of the correctional facility with respect to the incarcerated individual comprise restricting destination addresses of the incarcerated individual and the method further comprises refusing, by the incarcerated individual communication and/or media device, input or selection of a destination not allowed by the rules and regulations of the correctional facility with respect to the incarcerated individual.

19. The method of claim 13, wherein
the party is a non-incarcerated individual;
the date and time are a date and time for departure of the non-incarcerated individual from a location other than the correctional facility housing the incarcerated individual;
the destination of the party is the correctional facility housing the incarcerated individual; and
the pick-up of the party is pick-up of the non-incarcerated individual for transportation to the correctional facility housing the incarcerated individual.

20. The method of claim 13, wherein
the party is a non-incarcerated individual;
the date and time are a date and time for departure of the non-incarcerated individual from the correctional facility housing the incarcerated individual;
the destination of the party is away from the correctional facility housing the incarcerated individual; and
the pick-up of the party is pick-up of the non-incarcerated individual for transportation away from the correctional facility housing the incarcerated individual.

21. The method of claim 13, wherein paying for the transportation further comprises initiating, by the incarcerated individual communication and/or media device, payment for the transportation, by an incarcerated individual account management system configured to maintain the one or more correctional facility trust accounts to the benefit of the incarcerated individual, from the one or more correctional facility trust accounts.

\* \* \* \* \*